United States Patent
Gotoh et al.

[11] Patent Number: 6,060,806
[45] Date of Patent: May 9, 2000

[54] ELECTRIC MOTOR

[75] Inventors: Junichi Gotoh; Shinya Koseki, both of Yamagata, Japan

[73] Assignee: Mitsumi Electric Company Ltd., Tokyo, Japan

[21] Appl. No.: 09/100,716

[22] Filed: Jun. 19, 1998

[30] Foreign Application Priority Data

Jun. 30, 1997 [JP] Japan .................................. 9-189120

[51] Int. Cl.[7] .................................................. H02K 5/00
[52] U.S. Cl. .............................................. 310/89; 310/91
[58] Field of Search ........................... 310/89, 91, 256, 310/258, 67 R; 29/596, 598

[56] References Cited

U.S. PATENT DOCUMENTS

| 3,882,334 | 5/1975 | Newill | 310/52 |
| 3,982,146 | 9/1976 | Hokky | 310/89 |
| 5,268,607 | 12/1993 | McManus | 310/89 |

*Primary Examiner*—Nestor Ramirez
*Assistant Examiner*—Tran Nguyen
*Attorney, Agent, or Firm*—Whitham, Curtis & Whitham

[57] ABSTRACT

An electric motor includes a cylindrical metal casing 2, a stator 3 accommodating in the casing, and a metal spacer 10 interposed between the casing and the stator.

12 Claims, 2 Drawing Sheets

ELECTRIC MOTOR

BACKGROUND OF THE INVENTION

1. Field of the Invention

This invention relates to an electric motor in which the stator is accommodated in a metal casing, and more particularly to an assembly structure which improves the motor characteristic thereof.

2. Related Art

As shown in FIG. 4, in a stepping motor 1, its body includes: a bottomed-cylinder-shaped casing 2 of metal; a stator 3 accommodated in the casing 2; and a rotor 4 which is inserted into a circular opening 3a formed in the stator 3. The motor body is mounted through a bracket 5 on a variety of devices. The stator 3 is formed by uniting ring-shaped stator yokes 6, 6 and 6 through resin bobbins 7 and 7 on which wires are wound.

As shown in FIG. 3, the inside diameter L2 of the casing 2 accommodating the stator 3 is lightly larger than the outside diameter L3 of the stator 3 so that the stator can be mechanically inserted into the casing 2. In the case where the difference (L2–L3) is constant, no problem is involved in the assembling of the stator and the casing. However, if the difference, being fluctuated, is large, then the stator 3 is not in close contact with casing 2, and the assembling of them involves a problem. In FIG. 3, reference numeral 8 designates wires wound on the bobbins of the stator 3.

In the case where the stator 3 is not in close contact with the casing 2, the air gap is formed between them to break the magnetic circuit, so that the torque is decreased, the self start frequency characteristic is lowered; that is, the motor characteristic is lowered.

SUMMARY OF THE INVENTION

An object of the invention is to provide an electric motor which is advantageous in that, with simple parts added, the tolerances of parts are absorbed, and the deterioration in motor characteristic is prevented.

The foregoing object of the invention has been achieved by the provision of an electric motor which, according to the invention, comprises: a cylindrical metal casing; a stator accommodating in the casing; and a metal spacer interposed between the casing and the stator.

Preferably, the spacer is a metal member which is arcuate in section and whose arcuate length is about one-third of the circumference of the stator.

In the motor of the invention, the metal spacer is interposed between the casing and the stator. Therefore, even if the casing and the stator which are individually manufactured as parts are fluctuated in manufacturing tolerance, the casing and the stator are mechanically and magnetically in contact with each other. Hence, the deterioration in motor characteristic which attributes to the presence of the air gap is eliminated.

DETAILED DESCRIPTION OF THE PREFERRED EMBODIMENT

An electric motor, which constitutes a preferred embodiment of the invention, will be described with reference to the accompanying drawings.

Figure 1:
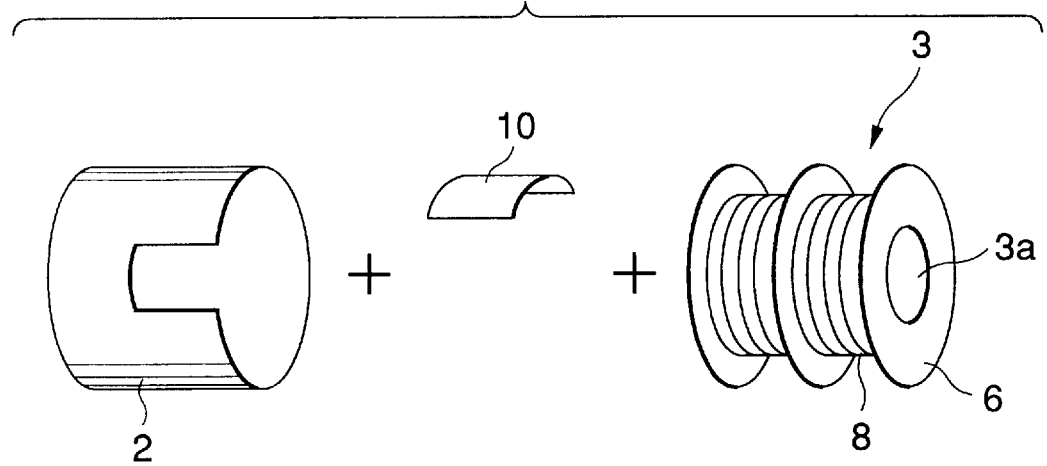
FIG. 1 is an assembling perspective view showing an electric motor, which constitutes a preferred embodiment of the invention.
Figure 3:
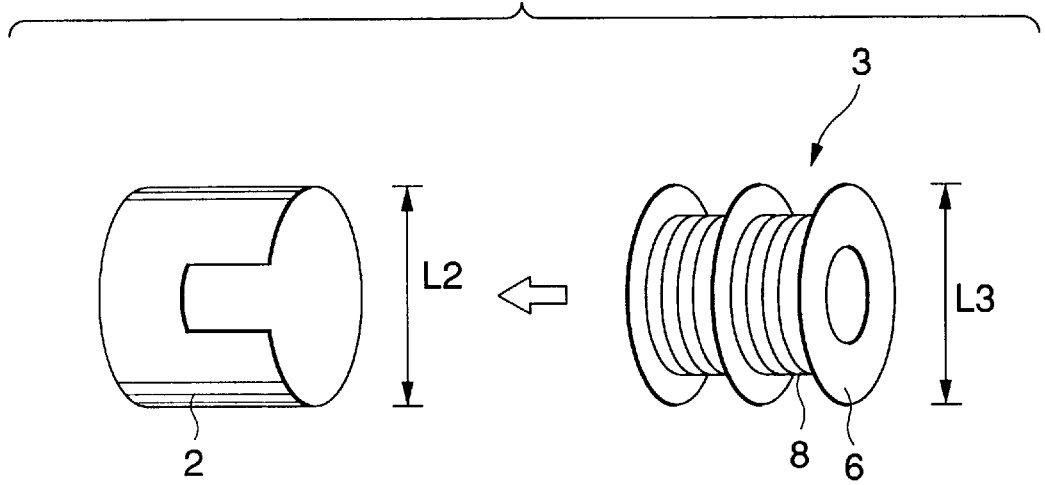
FIG. 3 is an assembling perspective view showing essential parts of the motor of the invention.
Figure 4:
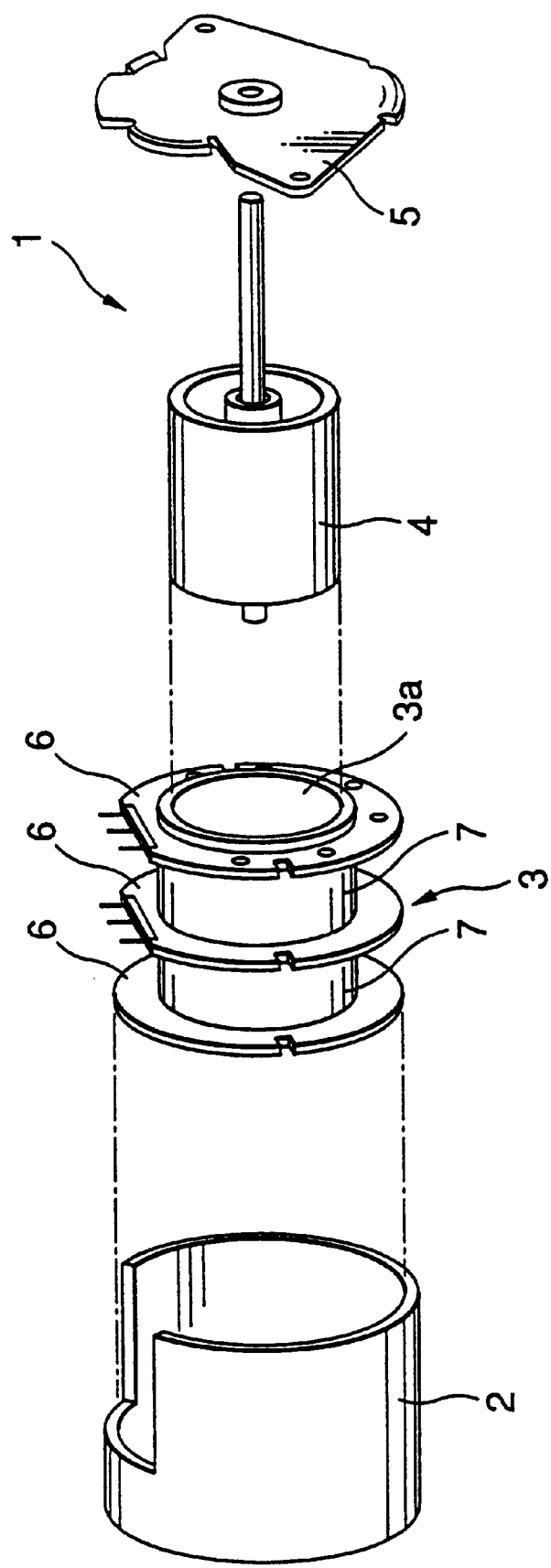
FIG. 4 is an assembling perspective view of a conventional spindle motor.

FIG. 1 is an assembling perspective view showing the embodiment of the invention. In FIG. 1, reference numeral 2 designates a bottomed; and 3, a stator. Those components 2 and 3 are the same as those in FIG. 3. Further in FIG. 1, reference numeral 10 designates a spacer according to the invention. The spacer 10 is used as follows: When the stator 3 is inserted into the casing 2, the spacer 10 is interposed between the inner cylindrical surface of the casing 2 and the outer cylindrical surface of the stator 3; in the embodiment, between the inner cylindrical surface of the casing 2 and the outer circular edges of the yoke flanges 6.

Figure 2:
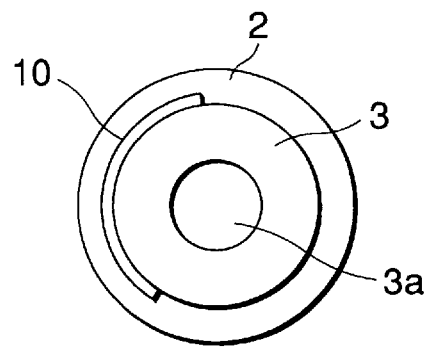
FIG. 2 is a bottom view of the motor shown in FIG. 1.

Preferably, the spacer 10 is made of Fe series metal material. More specifically, as shown in FIG. 2, the spacer 10 is an individual component which is arcuate in section and whose arcuate length is about one-third of the circumference of the stator. The spacer 10 is interposed between the casing 2 and the stator 3 as shown in FIG. 2. Therefore, even if an air gap is formed between the casing 2 and the stator 3 because of the fluctuation in tolerance, owing to the presence of the space 10 the casing 2 and the stator 3 are magnetically (or mechanically) in contact with each other.

Hence, the magnetic circuit including the stator 3 and the casing 2 is prevented from being broken by the air gap. This feature eliminates the difficulty that the electric motor characteristic is lowered; for instance, the torque is decreased, and the automatic start frequency is lowered.

In the invention, the spacer 10 is added to the motor; that is, the manufacturing cost is increased as much. However, the addition of the spacer 10 increases the motor manufacturing yield, and therefore the whole economical advantage taking the loss into consideration, the motor manufacturing cost per electric motor is decreased.

As is apparent from the above description, according to the invention, an electric motor is provided which is advantageous in that, with a simple part added, the tolerances of other parts are absorbed, and the deterioration in motor characteristic is prevented.

What is claimed is:

1. An electric motor, comprising:

a cylindrical casing;

a stator within said casing; and a spacer interposed between said casing and said stator, wherein said casing is separated from said stator by an amount corresponding to a thickness of said spacer, and wherein said stator has at least one yoke flange and wherein said spacer is located between and in contact with an outer circular edge of said yoke flange and an inner circumferential surface of said casing.

2. An electric motor as claimed in claim 1, wherein said spacer is arcuate in shape.

3. An electric motor as claimed in claim 2, wherein said spacer has an arcuate length which is approximately one-third of a circumference of said stator.

4. An electric motor as claimed in claim 1, wherein said spacer has a thickness which prevents formation of a gap between said stator and casing that reduces magnetic contact between said casing and said stator in a manner that causes a reduction in at least one of a motor torque, a self-start frequency characteristic of said motor, and motor characteristic to below a predetermined level.

5. An electric motor as claimed in claim 1, wherein said spacer is in contact with said casing and said stator.

6. An electric motor as claimed in claim 1, wherein said spacer is less than a full circle in cross-section.

7. An electric motor as claimed in claim 1, wherein said cylindrical casing is a metal casing.

8. An electric motor as claimed in claim 1, wherein said spacer is made from a metal material.

9. An electric motor, comprising:

a casing;

a stator within said casing, said stator having at least one yoke flange; and means for reducing a gap between said casing and said stator by an amount which prevents magnetic contact between said casing and stator from falling below a predetermined level, said means located between and in contact with an outer circular edge of said yoke flange and an inner circumferential surface of said casing.

10. An electric motor as recited in claim 9, wherein said predetermined level is a level which results in said motor achieving at least one of a desired torque, a self-start frequency characteristic, and a motor characteristic.

11. An electric motor, comprising:

a casing;

a stator within said casing, said stator having at least one yoke flange; and means for compensating for differences in mechanical tolerances between said casing and said stator, said means compensating for said tolerances by spacing said casing from said stator by a predetermined amount, said means located between and in contact with an outer circular edge of said yoke flange and an inner circumferential surface of said casing.

12. An electric motor, comprising:

a casing;

a stator within said casing, said stator having at least one yoke flange; and means for preventing deterioration in performance of said motor by spacing said casing from said stator by an amount that achieves a predetermined level of magnetic contact between said casing and said stator, said means located between and in contact with an outer circular edge of said yoke flange and an inner circumferential surface of said casing.

\* \* \* \* \*